Sept. 23, 1958 R. L. WALLACE, JR 2,853,631
SIGNAL-OPERATED SWITCH
Filed March 9, 1955

INVENTOR
R. L. WALLACE, JR.
BY Harry C. Hart
ATTORNEY 2,853,631

SIGNAL-OPERATED SWITCH

Robert L. Wallace, Jr., Plainfield, N. J., assignor to Bell Telephone Laboratories, Incorporated, New York, N. Y., a corporation of New York Application March 9, 1955, Serial No. 493,230

14 Claims. (Cl. 307—88.5)

This invention relates to signal-carrying signal-operated switching devices.

Many situations arise in communications technology in which it is required that the presence of a signal act to establish a low-impedance path for that signal between its source and a load. An important situation of this sort is found in a crosspoint switching network, a component of great and growing utility in the telephone switching art. The function of such a network is to establish a voice current path between one of a number of incoming conductors and one of a number of outgoing conductors under the influence of a mark signal which appears on the telephone line and precedes the voice signal. To this end it is common to provide a number of like devices, each interconnecting one incoming conductor with one outgoing conductor and located at the crosspoint of the net which is specified by those conductors.

For such a crosspoint switch the ideal current-voltage characteristic presents infinite impedance when the switch is "open," a voltage threshold such that when the incoming signal exceeds this threshold the switch trips into its closed condition, in which case its impedance is zero or very low, and a negative sloping portion between, which reflects a desirable bistable trigger action. While a gas tube displays a characteristic which closely approximates this ideal, it has to date proved difficult so to construct such a tube that its threshold tripping voltage falls at a convenient level. Semiconductor devices, to the contrary, can be so constructed as to have their tripping thresholds in desirable ranges, but they suffer, as a rule, from the fact that their impedances in the "open" circuit condition are not particularly high. This is especially objectionable when a large number of such devices are connected in parallel in which case, in addition to the desired signal path which is established by the "closed" device, the signal leaks through such nominally open circuit impedances to all the other conductors of a group.

Accordingly, the principal object of the present invention is to establish an electrical connection between an incoming conductor and an outgoing conductor for a signal, e. g., a voice signal, under the influence of that voice signal or of a mark signal which precedes it; to establish it in such fashion that the impedance introduced in the establishment of this path shall be very low and linear, while maintaining virtually complete isolation of the outgoing conductor from the incoming conductor prior to the establishment of this path. This object is attained, in accordance with the invention, by the provision of a signal-operated switch which comprises a triggered negative impedance converter connected in tandem with an ohmic resistor. In one illustrative embodiment this switch comprises two transistors of opposite conductivity types, whose current gains lie between one-half and one. An ohmic resistor interconnects the collector electrodes of the two transistors and a cross-coupling path interconnects the base electrode of each transistor with the collector electrode of the other transistor.

Each cross-coupling path includes a breakdown diode, poled to oppose the normal current of the transistor base electrode to which it is connected. The input terminals of the switch are connected to the emitter electrodes of the two transistors, respectively. No batteries or other power sources are required for the operation of the switch.

With this arrangement a conductor connected to the emitter electrode of the first transistor is isolated from another conductor connected to the emitter electrode of the second transistor. Such isolation continues until a signal voltage applied between these conductors exceeds the sum of the breakdown voltages of the two breakdown diodes. When it does, conduction starts in the transistors and, because the two diodes are now in their broken down conditions, the transistors rapidly reach saturation. Accordingly, the circuit is "tripped" to its "closed" condition in which the variational input impedance seen between the two emitter electrodes is closely equal to zero over a wide range of currents; i. e., it is linear over a substantial working range. Such linearity prevents distortion. At the same time, this low variational input impedance is accompanied by a direct-current resistance which is by no means zero, so that the voltage between the two emitter electrodes is equal to the breakdown voltage of one of the diodes. For this voltage the open circuit impedance of the switch is practically infinite. Hence, currents drawn by other switches of a group which may be connected in parallel with the switch in question are negligible.

The invention will be fully apprehended from the following detailed description of a preferred illustrative embodiment thereof taken in connection with the appended drawings in which.

Figure 1:
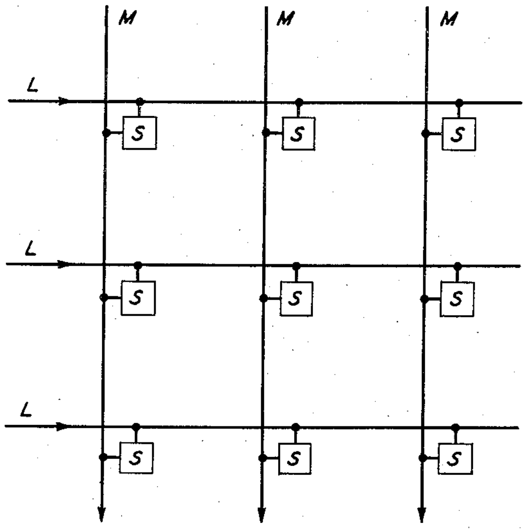
Fig. 1 is a schematic circuit diagram illustrating a crosspoint switching network.
Figure 2:
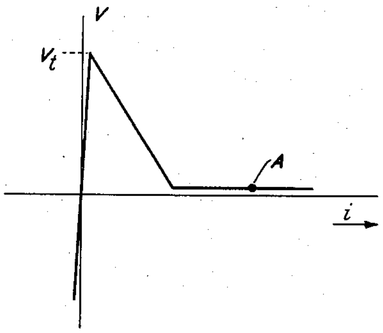
Fig. 2 is an ideal voltage-current characteristic for a crosspoint switch.

Referring now to the drawings, Fig. 1 illustrates a crosspoint switching network in which each of the devices interconnecting one horizontal conductor L with one vertical conductor M may be a signal-operated switch. For such an arrangement the ideal voltage-current characteristic of each such device is as shown in Fig. 2 wherein the very steep, indeed almost vertical, slope of the characteristic for low currents reflects complete isolation of the two terminals of the switch from each other for signals below the tripping threshold $V_t$. Once the signal has risen above the level $V_t$ a circuit having this characteristic trips to its second condition represented on the figure by the point A, in which case both the direct-current resistance of the switch and its variational impedance are negligible. Tripping takes place by virtue of the negative resistance of the device, represented by the downward slope of the intermediate portion of the characteristic.

Figure 3:
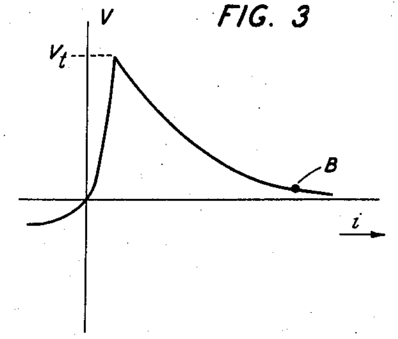
Fig. 3 is a voltage-current characteristic of prior art devices.

Fig. 3 shows a more realistic representation of the characteristic of a signal-operated switch of which a semiconductor device, e. g., a transistor, as the principal element. Conditions at the point B of Fig. 3 are substantially similar to those at the point A of Fig. 2. Moreover, the reduced slope of the rising portion of the characteristic of Fig. 3 at the origin represents a variational impedance for the switch in its nominally "open" condition through which leakage currents can flow.

Figure 4:
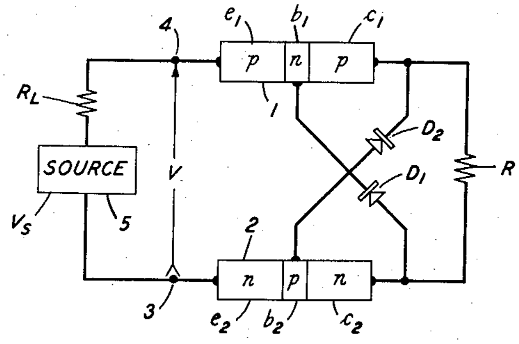
Fig. 4 is a schematic circuit diagram illustrating an embodiment of the invention.
Figure 5:
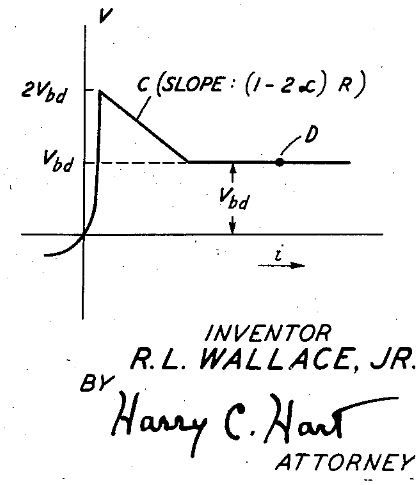
Fig. 5 is the voltage-current characteristic of the apparatus of Fig. 4.

Fig. 4 shows a switch which avoids the difficulties illustrated in Fig. 3, and Fig. 5 shows its voltage-current characteristic. It comprises a first transistor 1 of one conductivity type, for example N-type, and a second transistor 2 of opposite conductivity type, for example P-type. Each of these transistors is of the junction variety, e. g., the variety described in Shockley Patent 2,569,347, whose current multiplication factor $\alpha$ lies between one-half and one; preferably between 0.6 and 0.9. A resistor R interconnects the collector electrodes $C_1$, $C_2$ of the two transistors 1, 2. A first breakdown diode $D_1$ interconnects the base electrode $b_1$ of the first transistor 1 with the collector electrode $C_2$ of the second transistor 2 and a second breakdown diode $D_2$ interconnects the base electrode $b_2$ of the second transistor 2 with the collector electrode $C_1$ of the first transistor 1.

Accessible terminals 3, 4 are connected to the emitter electrodes $e_1$, $e_2$ of the two transistors and these in turn may be connected in series with a signal source 5 and a load $R_L$. No power source is required, all the power necessary to operate the switch being derived from the signal on the incoming line.

Each of the breakdown diodes $D_1$ and $D_2$ may be a so-called Zener diode, namely a semiconductor junction alloy device having the characteristic that beyond a critical applied reverse voltage the current through the device is substantially independent of the voltage across it. For reverse voltages below this critical voltage, the diode presents a very high impedance, while for forward voltages its impedance is very low. Such elements are described by Pearson and Sawyer in the Proceedings of the Institute of Radio Engineers for November 1952 (volume 40, page 1348) and in Shockley Patent 2,714,702, granted August 2, 1955 on application Serial No. 211,212, filed February 16, 1951.

As described in the aforementioned publication and patent, such elements can be fabricated to have a critical reverse voltage of practically any desired magnitude.

While the diodes $D_1$ and $D_2$ need not have like breakdown thresholds, nothing is gained in the present connection by unlikeness of breakdown threshold, and for the sake of simplicity of description the breakdown thresholds of these two devices will hereinafter be treated as alike, and of magnitude $V_{bd}$.

It is to be noted that the diodes $D_1$ and $D_2$ are poled in opposite senses with respect to the transistor electrodes, each being connected for forward conduction in the direction of the arrowhead which represents it. The normal base electrode current of an N-type transistor whose current gain is less than unity is outward from the base electrode, while the normal base electrode current of a P-type transistor whose current gain is less than unity is inward to the base electrode. Thus, each of these diodes $D_1$ and $D_2$ is poled for forward conduction of transistor base electrode current in a direction opposite to that of its normal flow.

The operation of the circuit of Fig. 4 is as follows: For zero or small values of the voltage V applied to the terminals 3, 4 in the direction shown, i. e., from the emitter $e_2$ of the P-type transistor 2 positively toward the emitter $e_1$ of the N-type transistor 1, the base electrodes of the transistors are prevented from carrying current by the fact that each of them has in series with it a breakdown diode, $D_1$ or $D_2$, biased in its reverse direction in which case its resistance is exceedingly high. This condition continues until the applied voltage V reaches a threshold value $2V_{bd}$, equal to the sum of the breakdown voltages of the diodes $D_1$ and $D_2$. When this threshold value is exceeded, the diodes $D_1$ and $D_2$ break down and present negligible variational resistance. The two transistors 1, 2 and the low resistance cross-coupling paths between them now constitute, in effect, a negative-impedance converter of conversion factor $1-2\alpha$ to whose output terminals a resistor R is connected. Hence, neglecting the effects of emitter resistance and base resistance, which are small, the negative impedance seen at the input terminals of this converter is $(2\alpha-1)R$. Negative impedance converters employing transistors in this fashion are described, and the conversion factor $1-2\alpha$ is derived, in an article by J. G. Linvill, published in the Proceedings of the Institute of Radio Engineers for June 1953, volume 41, page 725. They are also described in United States Patent 2,726,370, issued December 6, 1955, on an application of J. G. Linvill and R. L. Wallace, Jr., Serial No. 310,084, filed September 17, 1952.

As shown in Fig. 5 this negative impedance is represented by a negative sloping portion C of the characteristic which separates the threshold peak from the low impedance "closed" circuit condition of the switch.

As the switching transient proceeds to completion, and in consequence the voltage between the input terminals 3, 4 of the switch falls, a condition is reached in which the voltage between the collector electrode of each transistor and its base electrode is sensibly equal to zero, the steady voltage across the input terminals is equal to $V_{bd}$, and the variational resistance presented by the switch is negligible. This is the closed circuit condition of the switch, and it is represented in Fig. 5 by a straight line horizontal portion of the characteristic, on which is marked an operating point D. The characteristic may be intersected by a load line of slope $-R_L$ and intercept on the V axis equal to the voltage $V_s$ of the source 5. It will be noted that this horizontal portion of the characteristic of Fig. 5 intersects the steeply rising initial portion at a point where its resistance is exceedingly high, indeed almost infinite. Hence, establishment of a low-impedance circuit path between the two switch terminals by this circuit arrangement is not accompanied by leakage resistance of any of a number of similar switches which may be connected in parallel. It will further be noted that the "closed" condition holds for a wide range of currents or load lines, and that the straight line character of the curve of Fig. 5 over this range prevents the introduction of distortion by the switch.

What is claimed is:

1. A two-terminal bistable signal-operated device for connection between a signal source and a load and adapted to isolate said source from said load for signal voltages less than a preassigned threshold and to establish a low-impedance signal path of constant voltage from said source to said load in response to a signal voltage in excess of said threshold and without assistance from any source of power other than said signal source, which comprises a first transistor of one conductivity type and a second transistor of opposite conductivity type, each of said transistors having an emitter electrode, a collector electrode and a base electrode, a resistor interconnecting the collector electrodes of said transistors, a cross-coupling path interconnecting the base electrode of each transistor with the collector electrode of the other transistor, a breakdown diode connected in series in each of said paths, each of said breakdown diodes having a breakdown potential equal to one-half of said preassigned threshold and being poled to oppose the normal current of the transistor base electrode to which it is connected, and accessible terminals connected to said emitter electrodes, respectively.

2. A two-terminal bistable signal-operated apparatus for connection between a signal source and a load and adapted to isolate said source from said load for signal voltages less than a preassigned threshold and to establish a low-impedance signal path of constant voltage from said source to said load solely in response to a signal voltage in excess of said threshold, which comprises two amplifying devices each of which has an input electrode, an output electrode and a common electrode, said input electrodes being connected to said source and to said load, respectively, a cross-coupling path interconnecting the common electrode of each of said amplifying devices with the output electrode of the other of said amplifying devices, said apparatus constituting a negative impedance converter, a positive resistance element interconnecting said two output electrodes, whereby the impedance seen at said input electrodes is negatively proportional to said resistance element, and means for disabling said converter for signal voltages falling below said preassigned threshold, said disabling means comprising means for disestablishing at least one of said cross-coupling paths in response to signal voltages falling below said threshold.

3. A two-terminal bistable signal-operated apparatus for connection between a signal source and a load and adapted to isolate said source from said load for signal voltages less than a threshold of preassigned polarity and of preassigned magnitude greater than zero and to establish a low-impedance signal path from said source to said load in response to a signal voltage in excess of said threshold, which comprises a first transistor of one conductivity type and a second transistor of opposite conductivity type, each of said transistors having an emitter electrode, a collector electrode, a base electrode and a current multiplication factor $\alpha$, a resistor of resistance R interconnecting the collector electrodes of said transistors, a cross-coupling path interconnecting the base electrode of each transistor with the collector electrode of the other transistor, a breakdown diode characterized by a reverse breakdown voltage $V_{bd}$ connected in series in each of said paths, each of said breakdown diodes being poled to oppose the normal current of the transistor base electrode to which it is connected, and accessible terminals connected to said emitter electrodes, respectively, whereby said apparatus manifests a voltage-current characteristic, seen at said accessible terminals, having a first portion, for small currents, representing substantial resistance to steady currents and high variational resistance, rising to a peak voltage $2V_{bd}$ equal to the sum of the breakdown voltages of said diodes, a last substantially horizontal portion, for large currents, of negligible variational resistance and supporting a steady voltage $V_{bd}$, and an intervening portion connecting said first and last portions, having a negative slope representing a variational resistance of $(2\alpha-1)R$.

4. Apparatus as defined in claim 2 wherein each of said devices is a transistor.

5. Apparatus as defined in claim 4 wherein said transistors are of opposite conductivity types.

6. Apparatus as defined in claim 2 wherein each of said devices is a junction transistor.

7. Apparatus as defined in claim 2 wherein each of said devices has a current gain lying in the range 0.5–1.0.

8. Apparatus as defined in claim 2 wherein said disabling means comprises a rectifier connected in one of said cross-coupling paths.

9. Apparatus as defined in claim 2 wherein said disabling means comprises a rectifier connected in each of said cross-coupling paths.

10. Apparatus as defined in claim 9 wherein each of said rectifiers is a breakdown diode.

11. Apparatus as defined in claim 9 wherein said rectifiers are oppositely poled with respect to the common electrodes of said two devices.

12. Apparatus as defined in claim 11 wherein each of said rectifiers is poled to oppose the normal flow of current in the common electrode to which it is connected.

13. Apparatus as defined in claim 10 wherein said breakdown diodes have like breakdown voltages.

14. Apparatus as defined in claim 10 wherein said breakdown diodes are selected to have the sum of their breakdown voltages equal to said preassigned signal voltage threshold.

References Cited in the file of this patent

UNITED STATES PATENTS

| | | |
|---|---|---|
| 2,569,345 | Shea | Sept. 25, 1951 |
| 2,655,609 | Shockley | Oct. 13, 1953 |
| 2,728,857 | Sziklai | Dec. 27, 1955 |
| 2,751,549 | Chase | June 19, 1957 |